3,340,045
METHODS OF SLAG AND METAL TREATMENT WITH PERLITE
Alexander H. Colwell, Jr., Buffalo, N.Y., assignor to G. E. Smith, Inc., a corporation of Pennsylvania
No Drawing. Filed Aug. 5, 1964, Ser. No. 387,763
3 Claims. (Cl. 75—53)

ABSTRACT OF THE DISCLOSURE

A method of treating molten metal and slag to coagulate the slag for ease of removal which includes the step of adding finely divided perlite whose size has been selected so that it does not fuse into liquid but does expand into its expanded form at the temperature of the molten metal and slag.

---

This invention relates to methods of slag and metal treatment and particularly to a method of treating slag and metal in the ladle to eliminate slag contamination in the molten metal in the ladle, to coagulate the slag to a more easily removed form and finally to insulate the metal in the ladle to prevent or reduce the amount of metal loss by way of "skull" in the ladle. Pouring ladles are generally used in the iron, steel and non-ferrous alloy industries to convey molten metal from the melting furnace to the mold in which the metal is to be solidified or to the further refining furnace in which the metal undergoes additional treatment. When the metal is poured from the melting furnace, it carries with it at least a small portion of the slag which was formed during the melting operation. This slag rests on top of the molten metal, generally floating and rising as the metal rises in the ladle. The slag is generally quite liquid and a portion remains over the molten metal in the ladle when the pouring of the metal from the furnace is complete. It is necessary to remove this slag prior to pouring the metal into molds. In the past this has been a difficult and tedious job because of the fluidity of the slag and the fact that small areas of slag would separate and float on the metal which had to be gathered by hand and removed. Any slag portions which were not removed tended to create slag inclusions in the final product of the molding operation. In addition to the slag removal problem, there is a significant scrap problem resulting from the formation of skull on the walls of the ladle by reason of the cooling of the metal. This is particularly true where the metal stands for a considerable period of time in the ladle prior to pouring as occurs, for example, in transferring blast furnace iron from a blast furnace shop to an open hearth shop or some subsequent processing shop for blast furnace iron. Similarly in the iron foundry, the metal in the ladle may be held for some time prior to actual pouring. During this time, skull formation builds up to a very considerable extent.

I have discovered a method of treating molten metal and slag which eliminates in large measure the problem of slag removal by coagulating the slag into a viscous semicellular mass which sticks together and is removed as an entirety.

In addition, the treatment of my invention reduces the formation of skull and aids in protecting the lining of ladles so as to extend the life of the ladle in which the treatment is applied. I have discovered that the addition of perlite within certain size ranges to the metal and slag being poured into the ladle will form what appears to be a vitreous glass on the ladle walls which increases the life of the lining of the ladle. The perlite appears to expand as the ladle is filled and the heat is transmitted to the perlite to give a high degree of insulative covering and to absorb or coagulate the slag from a watery mass into a viscous cellular mass which attracts all of the individual slag particles in the metal and prevents their retention and/or re-entry into the metal bath, virtually eliminating the problem of slag inclusion.

I have also found that the practice of my invention appears to provide some reduction in sulfur and phosphorous compounds with a concomitant increase in the tensile strength of the metal treated.

I have found that an amount of perlite between about 1 and 2 pounds per ton of metal cast into the ladle is adequate to coagulate the slag and provide the insulative and other advantageous properties which occur. Larger amounts are excessively wasteful of the material. Lesser amounts generally fail to provide the necessary coagulative action and insulating properties. However, there are slags whose nature is such that smaller amounts may be used because of the inherent high viscosity and generally coagulative character of the slag.

I prefer to use a perlite within the following broad size range classifications:

|  | Percent |
|---|---|
| +8 mesh | 1.5–2.5 |
| Passing 8 mesh retained on 16 mesh | 70–90 |
| Passing 16 mesh retained on 20 mesh | 10–14 |
| Passing 20 mesh | 5.5–7.5 |

As a second preferred size range, I prefer a material as follows:

|  | Percent |
|---|---|
| +8 mesh | 2.1 |
| Passing 8 mesh retained on 16 mesh | 79 |
| Passing 16 mesh retained on 20 mesh | 12 |
| Passing 20 mesh | 6.9 |

While I prefer the size range set out hereinabove, a material will work satisfactorily if its size is such that it will expand in the presence of the amount of heat available on the ladle and will not become completely fused into a liquid mass. In short, if the material is too coarse, there will be insufficient heat per unit of surface to cause the material to expand. If the material is too fine, it tends to melt and enter into a true fusion becoming substantially completely liquid and losing its coagulative and insulative properties. Preferably, I add the perlite according to my invention in the bottom of the ladle as the metal and slag are being poured and I may from time to time add additional perlite as the pouring progresses.

The subject matter of the present invention may perhaps best be understood by a consideration of the following examples of a practice according to my invention.

Example I

Blast furnace iron was poured into 65-ton ladles to which had been added 98 pounds of perlite having a size range of:

|  | Percent |
|---|---|
| +8 mesh | 2.13 |
| Passing 8 mesh retained on 16 mesh | 78.93 |
| Passing 16 mesh retained on 20 mesh | 12.09 |
| Passing 20 mesh | 6.85 |

The blast furnace iron was poured directly into the ladle and when the ladle was full, the slag remaining on top of the ladle rather than being liquid and free-flowing as was the case on the ladles on which no perlite had been added, was viscous and cellular and was readily removed as a mass. The metal was poured to form ingot molds in the usual practice. The skull formed in those ladles which had not been treated according to the invention was compared with the skull remaining in the ladles treated according to the invention. It was found that the untreated ladles had 4,000 pounds of skull per ladle, whereas the ladles treated with perlite according to my invention had only 500 pounds of skull per ladle. This is an extraordinarily significant effect on ladle losses and shows the insulative effect which is accomplished by the practice of the invention.

*Example II*

In a ductile iron foundry it had been the practice to add the inoculants for the formation of ductile iron to the ladle prior to pouring. These inoculants were in the form of alloys of magnesium, nickel and manganese and were typical of the additives generally used in the ductile industry. When the molten iron was poured on top of the inoculants a considerable amount of slag was formed which built up on the walls damaging the lining and requiring a frequent relining practice. In this foundry a one-ton ladle was poured using 2 pounds of perlite in addition to the usual inoculants added in the bottom of the ladle. When the ladle was emptied, it was found that the excessive slag build up had been eliminated, that the amount of skull on the ladle had been virtually eliminated and that the interior of the ladle was coated with a thin glaze of a refractory character which had not been present in the conventional practice and which appeared to be the result of a coating formed by the perlite.

*Example III*

The practice of Example I was repeated with like results. The lining of the ladle was examined and it was found to have a refractory glaze similar to that described in Example II which protected the lining over a longer period of time and provided a longer useful life of the lining than had been heretofore possible. The metal resulting from the treatment was checked chemically against metal in ladles which had not been treated according to the invention but were poured at the same time from the same furnace. It was found that the metal treated according to the invention had lower sulfur and phosphorous content than the untreated metal. The metal in the untreated condition having a sulfur content of .026% and a phosphorous content of .030% was found, after treatment according to this invention, to have a sulfur content of about .019% and a phosphorous content of about .023%. The reduction in sulfur and phosphorous appears to come from the reaction of the alkaline components in the perlite. Since perlite contains a small amount of sodium oxide and a small amount of potassium oxide, this would appear to be the case. The same iron after treatment was found to have a tensile somewhat higher than the like from untreated.

The practice of the invention may be utilized in any slag metal system where the pouring temperature is in the range 2100° F. to 2900° F. The practice does not produce any noticeable smoke or fumes or noxious dusts. The time saved in skimming the slag from the ladle is very significant. The coagulated mass comes off in one single operation instead of requiring the labor of a man attempting to rake or rabble off small pieces of liquid slag as had been the practice in the past. While this coagulating and slag removal function is of great significance, the insulative effect which is combined with the coagulative effect is itself of very significant proportions. As has been pointed out in the examples, it has been found that the skull in ladles handling molten blast furnace iron can be reduced to one-eighth of their conventional weight and size. This is a tremendous saving in money and time and marks a very significant step forward in metal treatment.

In the foregoing specification, I have set out certain preferred practices and embodiments of my invention. It will be understood, however, that this invention may be otherwise applied within the scope of the following claims.

I claim:

1. The method of treating molten metal and slag to coagulate the slag and to insulate molten metal which comprises adding to the molten slag and metal about 1 to 2 pounds of perlite per ton of metal.

2. The method as claimed in claim 1 in which the perlite is in the size range:

|  | Percent |
|---|---|
| +8 mesh | 1.5–2.5 |
| Passing 8 mesh retained on 16 mesh | 70–90 |
| Passing 16 mesh retained on 20 mesh | 10–14 |
| Passing 20 mesh | 5.5–7.5 |

3. The method of treating slag and metal in the molten state to insulate the metal and coagulate the slag comprising adding to the molten metal and slag finely divided perlite whose size has been selected so that it does not fuse into a liquid at the temperature of the molten metal and slag does expand into the expanded form at such temperature.

References Cited

UNITED STATES PATENTS

| 429,744 | 6/1890 | Severance | 75—53 |
| 2,497,745 | 2/1950 | Stohr | 75—94 X |
| 2,501,698 | 2/1950 | Stecker | 252—378 |
| 2,565,107 | 8/1951 | Watts | 106—122 |
| 2,800,405 | 7/1957 | Rinesch | 75—24 |
| 2,992,096 | 7/1961 | Hamlet | 75—53 X |
| 3,202,504 | 8/1965 | Hamlet | 75—53 |

DAVID L. RECK, *Primary Examiner.*

H. TARRING, *Assistant Examiner.*